(12) United States Patent
Thiesson et al.

(10) Patent No.: US 7,421,380 B2
(45) Date of Patent: Sep. 2, 2008

(54) GRADIENT LEARNING FOR PROBABILISTIC ARMA TIME-SERIES MODELS

(75) Inventors: Bo Thiesson, Woodinville, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 11/011,864

(22) Filed: Dec. 14, 2004

(65) Prior Publication Data

US 2006/0129395 A1    Jun. 15, 2006

(51) Int. Cl.
*G06F 17/50* (2006.01)
*G06F 17/30* (2006.01)

(52) U.S. Cl. .................. 703/2; 702/182; 702/183; 702/184; 706/21

(58) Field of Classification Search ............ 703/2, 703/6; 702/184, 182, 183; 706/14, 21
See application file for complete search history.

(56) References Cited

U.S. PATENT DOCUMENTS

| | | | |
|---|---|---|---|
| 5,544,281 A | 8/1996 | Maruoka et al. | |
| 5,809,499 A | 9/1998 | Wong et al. | |
| 5,835,682 A | 11/1998 | Broomhead et al. | |
| 5,949,678 A | 9/1999 | Wold et al. | |
| 6,125,105 A * | 9/2000 | Edwards et al. | 370/230 |
| 6,336,108 B1 | 1/2002 | Thiesson et al. | |
| 6,345,265 B1 | 2/2002 | Thiesson et al. | |
| 6,363,333 B1 | 3/2002 | Deco et al. | |
| 6,408,290 B1 | 6/2002 | Thiesson et al. | |
| 6,496,816 B1 | 12/2002 | Thiesson et al. | |
| 6,529,891 B1 | 3/2003 | Heckerman | |
| 6,532,454 B1 * | 3/2003 | Werbos | 706/14 |
| 6,560,586 B1 | 5/2003 | Liang et al. | |
| 6,574,587 B2 | 6/2003 | Waclawski | |
| 6,735,580 B1 | 5/2004 | Li et al. | |
| 6,742,003 B2 | 5/2004 | Heckerman et al. | |
| 6,778,929 B2 | 8/2004 | Egi | |
| 6,807,537 B1 | 10/2004 | Thiesson et al. | |
| 6,853,920 B2 | 2/2005 | Hsiung et al. | |
| 6,882,992 B1 | 4/2005 | Werbos | |
| 6,928,398 B1 | 8/2005 | Fang et al. | |
| 6,987,865 B1 | 1/2006 | Szeliski et al. | |
| 7,092,457 B1 * | 8/2006 | Chugg et al. | 375/324 |

(Continued)

OTHER PUBLICATIONS

Bo Thiesson, et al., ARMA Time-Series Modeling With Graphical Models, Proceedings of the Twentieth Conference on Uncertainty in Artificial Intelligence, (2004), pp. 552-560. AUAI Press.

(Continued)

*Primary Examiner*—Thai Phan
(74) *Attorney, Agent, or Firm*—Amin, Turocy & Calvin, LLP

(57) ABSTRACT

The subject invention leverages the conditional Gaussian (CG) nature of a continuous variable stochastic ARMA$^{xp}$ time series model to efficiently determine its parametric gradients. The determined gradients permit an easy means to construct a parametric structure for the time series model. This provides a gradient-based alternative to the expectation maximization (EM) process for learning parameters of the stochastic ARMA$^{xp}$ time series model. Thus, gradients for parameters can be computed and utilized with a gradient-based learning method for estimating the parameters. This allows values of continuous observations in a time series to be predicted utilizing the stochastic ARMA$^{xp}$ time series model, providing efficient and accurate predictions.

27 Claims, 11 Drawing Sheets

U.S. PATENT DOCUMENTS

| | | | |
|---|---|---|---|
| 7,139,703 | B2 | 11/2006 | Acero et al. |
| 2002/0072882 | A1 | 6/2002 | Kruger et al. |
| 2003/0039867 | A1 | 2/2003 | Meek et al. |
| 2003/0046038 | A1* | 3/2003 | Deligne et al. ............... 702/190 |
| 2003/0055614 | A1 | 3/2003 | Pelikan et al. |
| 2003/0065409 | A1 | 4/2003 | Raeth et al. |
| 2003/0176931 | A1 | 9/2003 | Pednault et al. |
| 2004/0068199 | A1 | 4/2004 | Echauz et al. |
| 2004/0068332 | A1 | 4/2004 | Ben-Gal et al. |
| 2004/0101048 | A1 | 5/2004 | Paris |
| 2004/0260664 | A1 | 12/2004 | Thiesson et al. |
| 2005/0015217 | A1 | 1/2005 | Weidl et al. |
| 2005/0096873 | A1* | 5/2005 | Klein .......................... 702/184 |
| 2006/0074558 | A1 | 4/2006 | Wiliiamson et al. |
| 2006/0129395 | A1 | 6/2006 | Thiesson et al. |
| 2006/0247900 | A1 | 11/2006 | Brocklebank |
| 2007/0150077 | A1 | 6/2007 | Bocharov et al. |
| 2008/0010043 | A1 | 1/2008 | Thiesson et al. |

OTHER PUBLICATIONS

Bach, F.G., et al., Learning Graphical Models For Stationary Time Series, (2004), IEEE Transactions On Signal Processing, to appear.
Cooper, G., et al., A Model For Temporal Probabilistic Reasoning (Technical Report KSL-88-30), (1998), Stanford University, Section On Medical Informatics, Stanford, California.
Ghahramani, Z., Learning Dynamic Bayesian Networks. In Adaptive Processing Of Sequences And Data Structures. Lecture Notes in Artificial Intelligence, (1998), p. 168-197, Springer-Verlag, Berlin.
Lauritzen, S. L., et al., Stable Local Computation With Conditional Gaussian Distributions, Statistics and Computing, (2001), pp. 11, 191-203.
Meek, C., Chickering, et al., Autoregressive Tree Models For Time-Series Analysis, Proceedings Of the Second Internationsl SIAM Conference On Data Mining, (2002), pp. 229-244, Arlington, VA: SIAM.
Bo Thiesson, et al., Efficient gradient computation for conditional Gaussian models. In Ghahramani, Z. and Cowell, R., editors, Proceedings of 10th Int'l Workshop on Artificial Intelligence and Statistics. The Society of Artificial Intelligence and Statistics, Jan. 2005.
Box, G.E.P., et al, Time Series Analysis : Forecasting & Control (3rd Edition), 1994, Prentice Hall, New Jersey.
Golub, G. H, et al., Matrix computations, 1996, The Johns Hopkins University Press, London.
Reinsel, G. C., Elements Of Multivariate Time series Analysis, 2003, Springer-Verlag, New York.
Dempster, A. P., et al., Maximum Likelihood From Incomplete Data Via The EM Algorithm, 1997, Journal of the Royal Statistical Society, B39, pp. 1-38.
Jones R. H., Maximum Likelihood Fitting Of ARMA Models To Time series With Missing Observation, 1980, Technometrics, vol. 22, pp. 389-395.
Penzer, J., et al., The Exact Likelihood Of An autoregressive-Moving Average Model With Imcomplete Data, (1997), Biometrika, vol. 84, pp. 919-928.
Kai Ming Ting, et al., Theory Combination: an alternative to Data Combination, 1996, 22 pages.
Sam-Joo Doh, et al., Inter-Class MLLR For Speaker Adaptation, Department of Electrical and Computer Engineering and School of Computer Science, Carnegie Mellon University, 2000, 4 pages.
Oliver Siohan, et al., Structural Maximum a Posteriori Linear Regression For Fast HMM Adaptation, Multimedia Communications Research Lab Bell Laboratories—Lucent Technologies, 2000, 8 pages.
Andrew W. Moore, et al. Efficient Locally Weighted Polynomial Regression Predictions, 1997, 9 pages.
Aram Karalic. Employing Linear Regression in Regression Tree Leaves, European Conference on Artificial Intelligence. 1992, 2 pages.
Hugh Chipman, et al. Bayesian Treed Models, Feb. 2001, 29 pages.
George Kapetanios, Threshold Models for Trended Time Series, 1999, 32 pages.
Felix A. Gers, et al. Applying LSTM to Time Series Predictable Through Time-Window Approaches, 2001, 21 pages.
David Maxwell Chickering, et al. A Bayesian Approach to Learning Bayesian Networks with Local Structure, Aug. 1997, 19 pages.
Neil A. Gershenfeld, et al. The Future of Time Series, 1993, pp. i-iii, 1-70, 569-582.
Craig F. Ansley. An algorithm for the exact likelihood of a mixed autoregressive-moving average process, 1979, vol. 66, pp. 59-65, Biometrika.
John Binder, et al. Adaptive probabilistic networks with hidden variables; Machine Learning, 1997, 213-244, 29.
Bo Thiesson. Score and Information for Recursive Exponential Models with Incomplete Data. In Geiger, D. and Shenoy, P.P., editors. Proceedings of the 13th Conference on Uncertainty in AI, 1997 pp. 453-463. Morgan Kaufmann Publishers.
Berzuini, et al. "A Unified Approach for Modelling Longitudinal and Failure Time Data, with Application in Medical Monitoring." IEEE Trans. On Pattern Analysis and Machine Intelligence. Feb. 1996, vol. 18, issue 2, pp. 109-123.
Chickering, et al. "Efficient Determination Of Dynamic Split Points in a Decision Tree." Proc. IEEE Int'l. Conf. on Data Mining. Nov. 29-Dec. 2, 2001. pp. 91-98.
Chipman, et al. Bayesian Treed Models, Feb. 2001. pp. 1-29.
Coggers. Modern Regression Methods: A Comparative Discussion, Apr. 19, 2001, pp. 1-11.
Gers. Applying LSTM to Time Series Predictable Through Time Window Approaches, 2001, pp. 1-8.
Heckerman, et al. "Casual Independence for Probability Assessment and Interference Using Bayesian Networks." IEEE Transactions on Systems, Man and Cybernetics. Nov. 1996, vol. 26, Issue 6, pp. 826-831.
Heckerman, et al. "Dependency Networks on Inference, Collaboration Filtering and Data Visualization." The Journal of Machine Learning Research. Sep. 2001, vol. 1, pp. 49-75.
Howell Tong, Threshold Models in Non-Linear Time Series Analysis, 1983, 323 pages, Springer-Verlag, New York, NY.
Kapetanios. A Threshold Model for Trended Time Series, 1999, pp. 1-32.
Meek, et al. Autoregressive Tree Models for Time Series Analysis. Jan. 10, 2002. http://research.microsoft.com/~meek/papers/dmart.ps &pub=63.
Meek. "Annotated Bibliography of Papers by Christopher Meek." Mar. 2005, printed Dec. 28, 2006. http://research.microsoft.com/~meek/mypapers.htm.
P. A. W. Lewis, et al., Modeling Time Series by Using Multivariate Adaptive Regression Splines (MARS), Time Series Prediction, 1994, pp. 297-318, Addison Wesley, New York, NY.
U.S. Appl. No. 11/005,148, filed Dec. 6, 2004, Thiesson, et al.
Bo Thiesson, David Maxwell Chickering, David Heckerman, and Christopher Meek, ARMA Time Series Modeling with Graphical Models, Proceedings of the Twentieth Conference on Uncertainty in Artificial Intelligence, 2004, pp. 552-560, AUAI Press.
Francis R. Bach and Michael I. Jordan, Learning Graphical Models for Stationary Time Series, IEEE Transactions on Signal Processing, 2004, pp. 2189-2199.
Gregory F. Cooper, Eric J. Horvitz, and David E. Heckerman, A Method for Temporal Probabilistic Reasoning, Technical Report KSL-88-30, 1988, Stanford University, Section on Medical Informatics, Stanford, CA, 24 pages.
Thomas Dean and Keiji Kanazawa, Probabilistic Temporal Reasoning, Technical Report, May 1988, Brown University, pp. 524-528.
Zoubin Ghahramani, Learning Dynamic Bayesian Networks, Adaptive Processing of Sequences and Data Structures, Lecture Notes in Artificial Intelligence, 1998, pp. 168-197, Springer-Verlag, Berlin.
Steffen L. Lauritzen and Frank Jensen, Stable Local Computation with Conditional Gaussian Distributions, Statistics and Computing, 2001, pp. 191-203.
C. Meek, D.M. Chickering, and D. Heckerman, Autoregressive Tree Models for Time-Series Analysis, Proceedings of the Second International SIAM Conference on Data Mining, 2002, pp. 229-244, SIAM, Arlington, VA.

* cited by examiner

GRADIENT LEARNING FOR PROBABILISTIC ARMA TIME-SERIES MODELS

RELATED APPLICATIONS

This application is related to co-pending and co-assigned U.S. applications entitled "SYSTEMS AND METHODS FOR NEW TIME SERIES MODEL PROBABILISTIC ARMA," client reference MS302094.01, filed on Jun. 17, 2003 and assigned Ser. No. 10/463,145 and "EFFICIENT GRADIENT COMPUTATION FOR CONDITIONAL GAUSSIAN GRAPHICAL MODELS," client reference MS309231.01, filed on Dec. 6, 2004 and assigned Ser. No.11/005,148. The above-noted applications are incorporated herein by reference.

TECHNICAL FIELD

The subject invention relates generally to data analysis, and more particularly to systems and methods for providing a model gradient for tied parameters in a continuous variable, stochastic autoregressive moving average, cross-predicting ($\sigma ARMA^{xp}$) time series model.

BACKGROUND OF THE INVENTION

The use of data analysis tools has increased dramatically as society has become more dependent on digital information storage. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining is typically the extraction of information from data to gain a new, insightful perspective. Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

A Bayesian network is one type of a graphical statistical model that encodes probabilistic relationships among variables of interest. Over the last decade, the Bayesian network has become a popular representation for encoding uncertain expert knowledge in expert systems. When used in conjunction with statistical techniques, the graphical model has several advantages for data analysis. Because the model encodes dependencies among all variables, it readily handles situations where some data entries are missing. A graphical model, such as a Bayesian network, can be used to learn causal relationships, and hence can be used to gain understanding about a problem domain and to predict the consequences of intervention. Because the model has both a causal and probabilistic semantics, it is an ideal representation for combining prior knowledge (which often comes in causal form) and data. Additionally, Bayesian statistical methods in conjunction with Bayesian networks offer an efficient and principled approach for avoiding the over fitting of data.

Graphical statistical models facilitate probability theory through the utilization of graph theory. This allows for a method of dealing with uncertainty while reducing complexity. The modularity of a graphical model permits representation of complex systems by utilizing less complex elements. The connections and relationships of individual elements are identified by the probability theory, while the elements themselves are constructed by the graph theory. Utilizing graphics also provides a much more intuitive human interface to difficult problems.

Nodes of a probabilistic graphical model represent random variables. Their connectivity can indicate associative qualities such as dependence and independence and the like. If no connectivity (i.e., "arcs") is present, this represents conditional independence assumptions, providing a representation of joint probability distributions. Graphical models can be "directed" or "undirected" depending on how they are constructed. Undirected graphical models have a more simplistic definition of independence, while directed graphical models are more complex by nature. Bayesian or "Belief" networks (BN) are included in the directed category and are utilized extensively in statistics and artificial intelligence to show causality between elements or "nodes." They are also highly beneficial in supplying "inferences." That is, they are able to infer information based on a posterior probability (i.e., "likelihood") utilizing Bayes' rule. Thus, for a given outcome, its cause can be probabilistically deduced utilizing a directed graphical model.

A graphical statistical model represented by a directed acyclic graph (DAG), such as a Bayesian network, can also be applied to represent and provide predictions relating to a time series. The stochastic $ARMA^{xp}$ time series models are based on the well-known autoregressive, moving average (ARMA) time-series models, as represented as Bayesian networks. By understanding and modeling the persistence of time series, predictions can be made regarding future values of those time series. This proves invaluable in economics, business, and industrial arenas. Predicting behavior allows one to adjust parameters if the desired outcome is not the predicted outcome. Thus, for example, a company can predict its stock value based on current financial states and determine if they need to improve on cash reserves, sales, and/or capital investments in order to achieve a desired stock price. This also permits a study of the "influence" of various parameters on future values.

Although the usefulness of this type of modeling is substantial, sometimes determining the parameters of ARMA based time series models can prove difficult when the time series has some missing observations. Being able to efficiently compute the parameters is extremely beneficial for employment of these types of models. Without ease-of-use, the degree of difficulty may preclude their use and diminish the amount of valuable information that might otherwise be obtained from data.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The subject invention relates generally to data analysis, and more particularly to systems and methods for providing a model gradient for tied parameters in a continuous variable, stochastic autoregressive moving average, cross-predicting (stochastic $ARMA^{xp}$) time series model. The conditional Gaussian (CG) nature of the continuous variable model is leveraged to efficiently determine its parametric gradients. The determined gradients permit an easy means to construct a parametric structure for the time series model. This provides a gradient-based alternative to the expectation maximization (EM) process for learning parameters of a continuous variable stochastic ARMA$^{xp}$ time series model. Thus, gradients for parameters can be computed and utilized with a gradient-based learning method for estimating the parameters. This allows values of continuous observations in a time series to be accurately predicted utilizing the learned stochastic ARMA$^{xp}$ time series model, providing efficient and accurate predictions.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
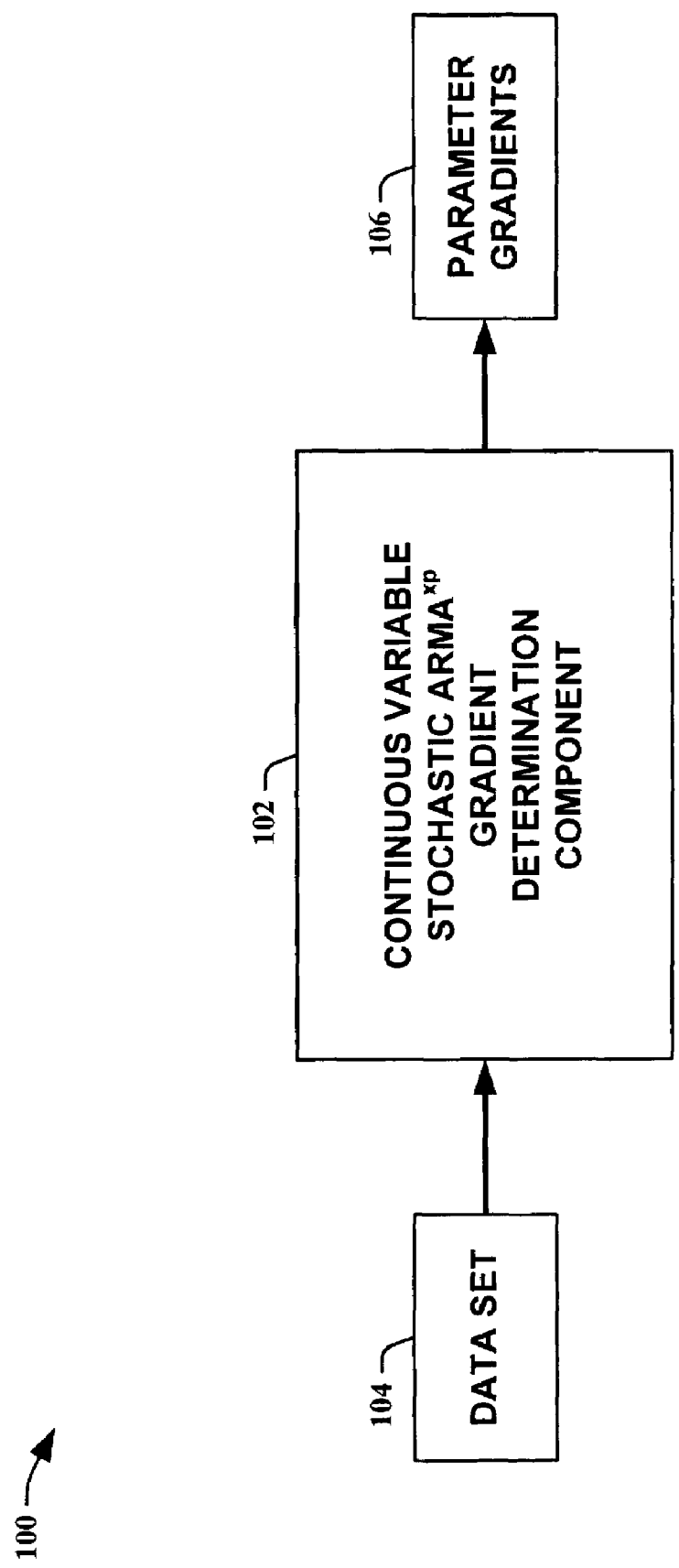
FIG. 1 is a block diagram of a continuous variable stochastic ARMA$^{xp}$ gradient determination system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The subject invention provides an efficient means to determine a gradient for parameters in a continuous variable stochastic ARMA$^{xp}$ time series model, which can be utilized in a gradient-based learning method for estimating parameters of the model. The subject invention is also a gradient-based alternative to an expectation maximization (EM) process for learning parameters of a continuous variable stochastic ARMA$^{xp}$ time series model. In general, the stochastic ARMA$^{xp}$ time series models may contain both discrete and continuous variables. However, the subject invention considers only models with continuous variables. For this case, a stochastic ARMA$^{xp}$ time series model is actually a Gaussian model due to the fact that all of the variables are continuous (i.e., a special case of the conditional Gaussian model or CG model). In addition, parameters of the model are tied in a particular way across time steps in the model. CG models are also known as Bayes nets with both discrete and continuous variables.

The subject invention is related to Systems And Methods For New Time Series Model Probabilistic ARMA which defines a new probabilistic (or stochastic) version of a time series model class that has some degree of familiarity in data analysis circles and is known as the ARMA (auto-regressive, moving average) models. The probabilistic version also allows inclusion of cross-predictors. Thus, this class of model is called probabilistic (or stochastic) ARMA$^{xp}$, where xp in the name stands for cross predictor. The reference illustrates how to select the structure for a stochastic ARMA$^{xp}$ model—that is, the number of auto-regressor variables, the number of moving average variables, and cross-predictor variables. It also shows how to utilize an EM algorithm to estimate a parameterization for a model (with a particular structure), and how to utilize a particular parameterized model for predictions.

The subject invention is also related to Efficient Gradient Computation For Conditional Gaussian Graphical Models. This reference provides a way to efficiently compute parameter gradients from incomplete data for a well-known class of conditional Gaussian (CG) graphical models. The computation of parameter gradients given incomplete data is an important step in learning the parameters of a statistical model with missing data. In particular, for gradient-based optimization methods such as, for instance, the conjugate gradient method, the gradient is utilized to iteratively adapt the parameters of the model in order to improve the incomplete-data log-likelihood and, in this way, identify the maximum likelihood estimate or local maxima of the incomplete-data log-likelihood.

In FIG. 1, a block diagram of a continuous variable stochastic ARMA$^{xp}$ gradient determination system 100 in accordance with an aspect of the subject invention is shown. The continuous variable stochastic ARMA$^{xp}$ gradient determination system 100 is comprised of a continuous variable stochastic ARMA$^{xp}$ gradient determination component 102 that receives a data set 104 and outputs parameter gradients 106. The data set 104 includes data about a variable set of continuous variables and possibly contains incomplete observation data about the variable set. The continuous variable stochastic ARMA$^{xp}$ gradient determination component 102 employs probabilistic inference techniques to determine the parameter gradients 106 for (tied) parameters of a model despite the possible incompleteness of data in the data set 104. This is accomplished in an extremely efficient manner and substantially facilitates gradient optimization processes to quickly iterate and obtain optimized parameters. These parameters can then be utilized to facilitate in predicting time series data.

Figure 2:
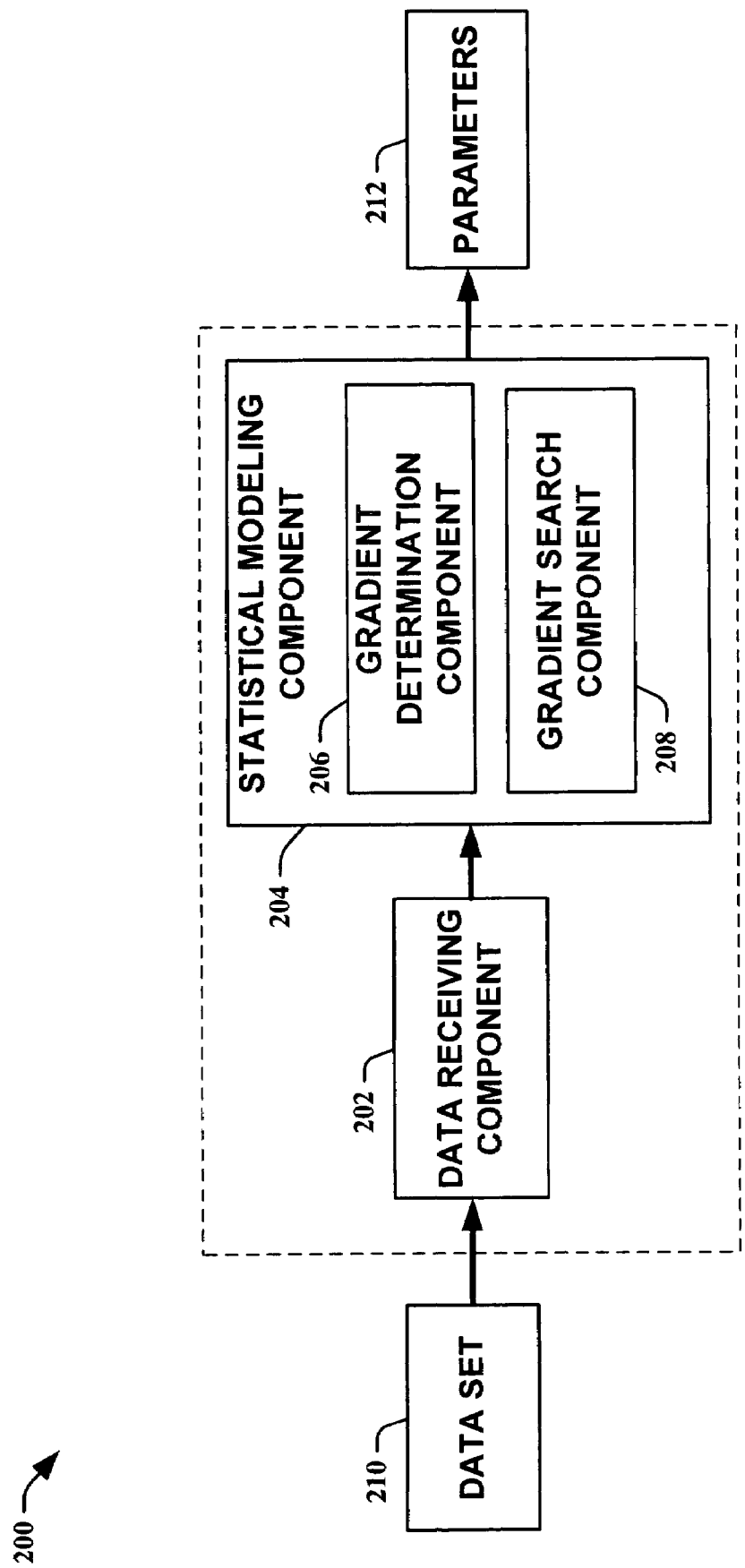
FIG. 2 is another block diagram of a continuous variable stochastic ARMA$^{xp}$ parameter determination system in accordance with an aspect of the subject invention.

Referring to FIG. 2, another block diagram of a continuous variable stochastic ARMA$^{xp}$ parameter determination system 200 in accordance with an aspect of the subject invention is depicted. The continuous variable stochastic ARMA$^{xp}$ parameter determination system 200 is comprised of a data receiving component 202 and a statistical modeling component 204 comprising a gradient determination component 206 and a gradient search component 208. Data 210 is received by the data receiving component 202 and passed to the statistical modeling component 204. The two components 206 and 208 in the statistical modeling component 204 facilitate via an iterative process in constructing optimal parameters 212 for the time series model. This allows this instance of the subject invention to provide time series model parameters based on the data set 210.

Figure 3:
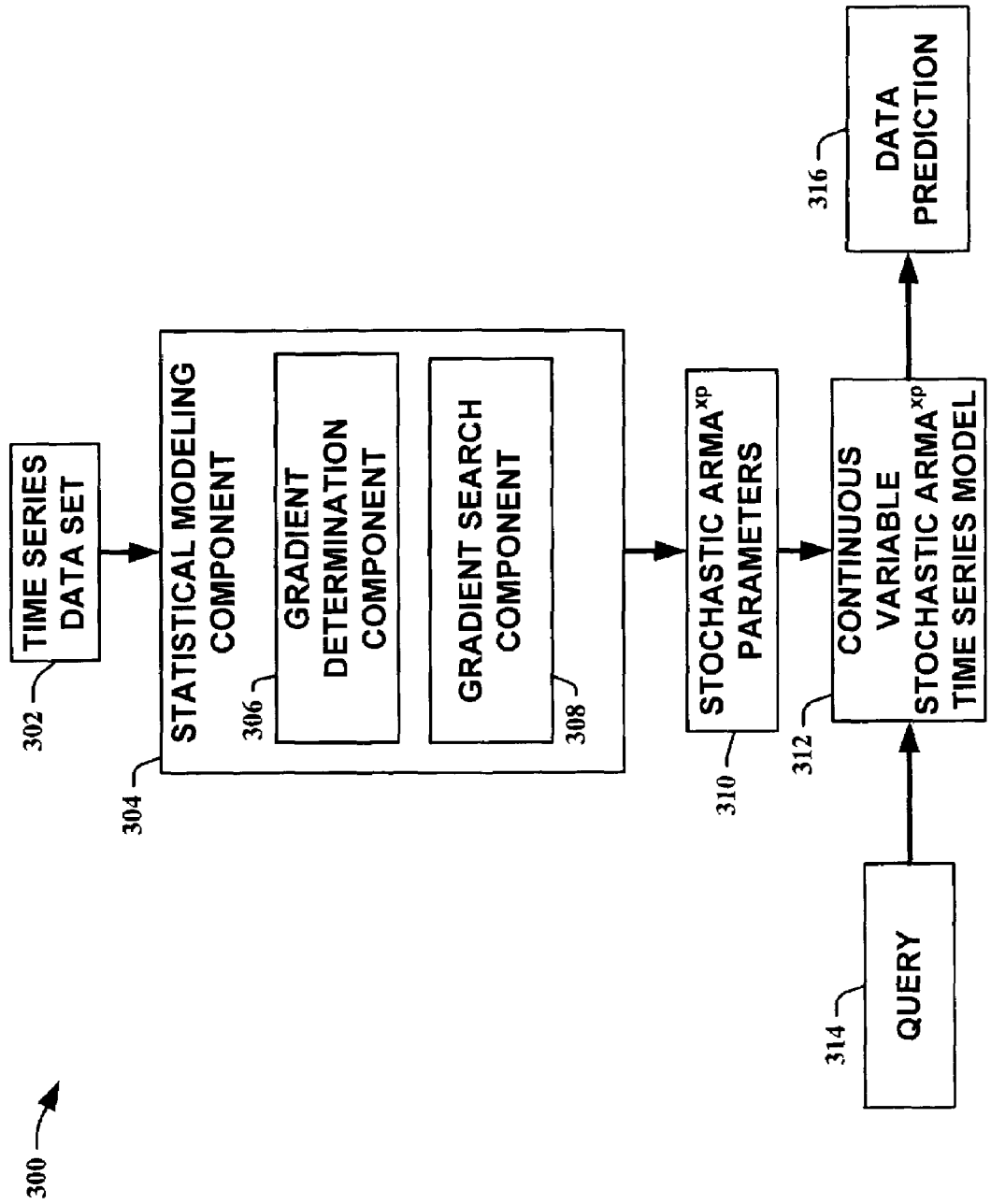
FIG. 3 is a diagram illustrating a data flow for a prediction system facilitated by a continuous variable stochastic ARMA$^{xp}$ time series model in accordance with an aspect of the subject invention.

Turning to FIG. 3, a diagram illustrating a data flow 300 for a prediction system facilitated by a continuous variable stochastic ARMA$^{xp}$ time series model in accordance with an aspect of the subject invention is shown. The data flow 300 demonstrates how the subject invention can facilitate statistical modeling of a continuous variable stochastic ARMA$^{xp}$ time series model 312. A time series data set 302 is received by a statistical modeling component 304 comprising a gradient determination component 306 and a gradient search component 308. The gradient determination component 306 processes the time series data 302 and determines parameter gradients for parameters of the continuous variable stochastic ARMA$^{xp}$ time series model 312. The parameter gradients are then utilized by the gradient search component 308 to determine stochastic ARMA$^{xp}$ parameters 310. The gradient search component 308 utilizes gradient-based learning processes to determine optimal parameters from the parameter gradients. Once the stochastic ARMA$^{xp}$ parameters 310 are determined, they can be utilized to facilitate the continuous variable stochastic ARMA$^{xp}$ time series model 312, which can provide predictive information. Thus, given a query 314, the time series model 312 can provide a data prediction 316 for that query 314. The subject invention allows for a more complete continuous variable stochastic ARMA$^{xp}$ time series model 312.

Figure 4:
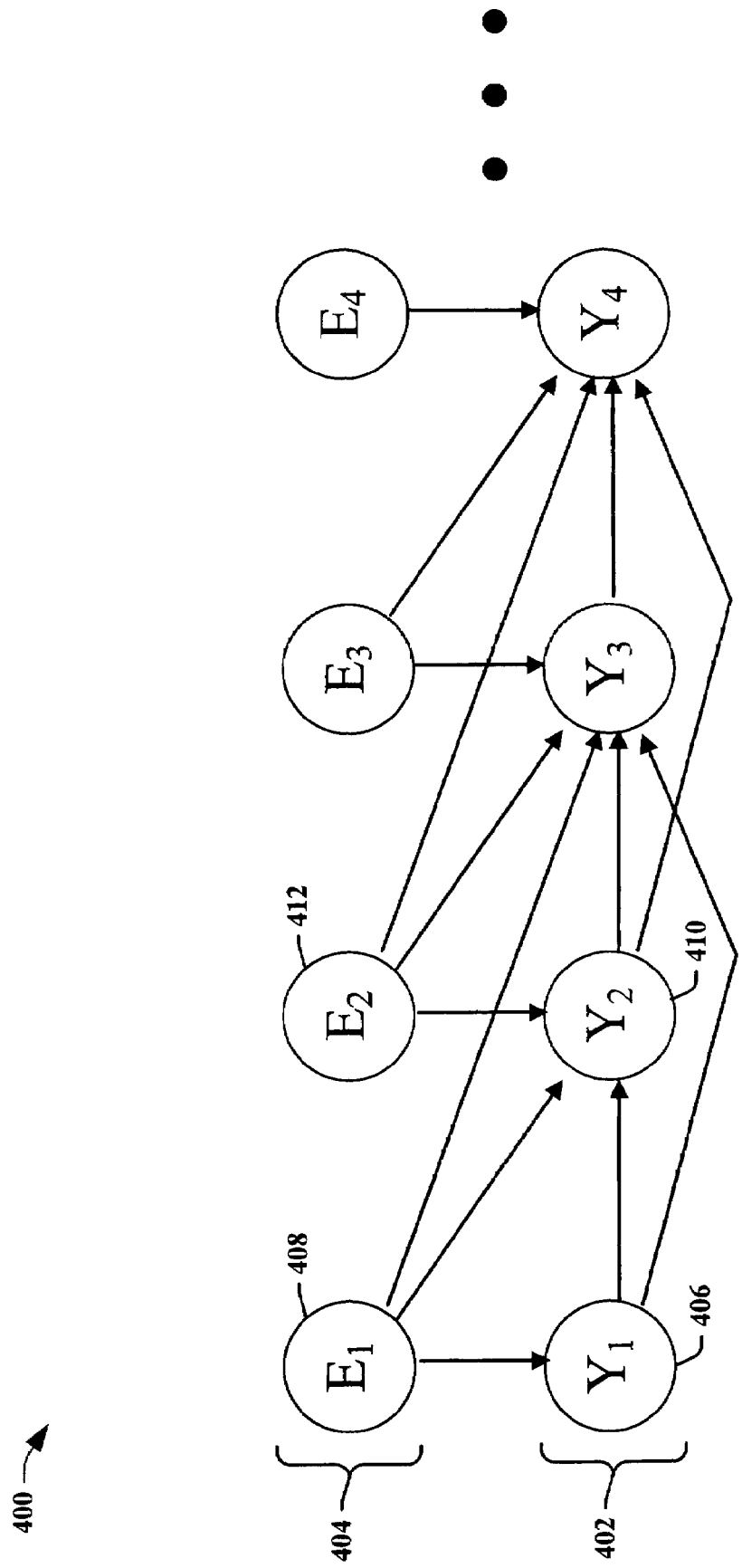
FIG. 4 is a diagram illustrating a directed acyclic graph for an ARMA(2,2) model in accordance with an aspect of the subject invention.

This type of statistical modeling is beneficial because it allows one to predict an outcome before it is known. The stochastic ARMA$^{xp}$ time series model is based on the class of ARMA(p,q) models, for which any member can be described by a directed acyclic graph (DAG) model (a.k.a., Bayes net). For example, consider the set of observations $y=(y_1, \ldots, y_n)$, where $y_t$ is the observation of entity "y" at time "t." The ARMA(2,2) model for this time series can be described, in part, by a DAG model 400 as illustrated in FIG. 4, where $Y_t$ 402 is a continuous variable corresponding to the observation $y_t$, and $E_t$ 404 is a hidden continuous variable associated with the observation at time "t." Each E has the same unknown mean and variance. Each Y is the same deterministic, linear function of its parents, where the coefficients are unknown. (An exception to the equality of functions occurs at the "boundary" of early times. In this example, $Y_1$ 406 is only a function of $E_1$ 408, and $Y_2$ 410 is only a function of $E_1$ 408, $E_2$ 412, and $Y_1$ 406.)

In general, the DAG model for an ARMA(p,q) model is one where the previous p Y's point to a given Y, and the current E and previous q E's point to a given Y. Again, each E has the same unknown mean and variance; and each Y (except for early times) is the same deterministic, linear function of its parents where the coefficients are unknown. The parameters of the model (the unknown quantities) are estimated from data by a procedure described in Ansley, C. F. (1979); *An Algorithm for the Exact Likelihood of a Mixed Autoregressive-Moving Average Process;* Biometrik 66, 59-65.

The probabilistic (or stochastic) ARMA$^{xp}$ class of models includes the following generalizations of the ARMA class: (1) the relationship between an observation variable and its parents is non-deterministic. (2) multiple cross predicting time series can be handled by the same model; and (3) some observations may be discrete/finite. Only the generalizations (1) and (2) are considered for the subject invention.

Figure 5:
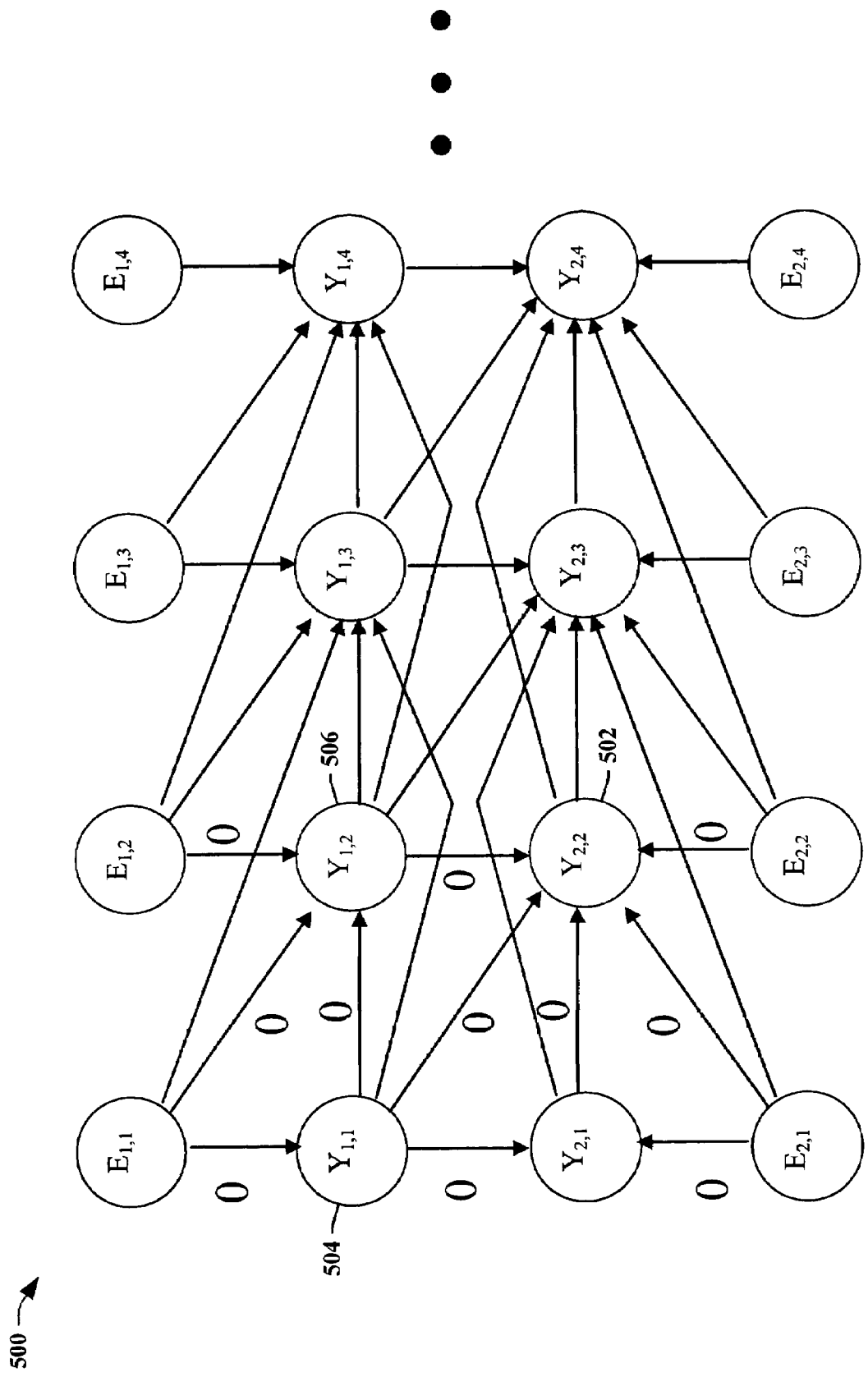
FIG. 5 is a diagram illustrating a directed acyclic graph for a stochastic ARMA$^{xp}$ model that can be utilized to predict two time series in accordance with an aspect of the subject invention.

Consider a set of continuous observations $y=(y_{1,1}, y_{2,1})$, $(y_{1,2}, y_{2,2}) \ldots, (y_{1,T}, y_{2,T})$ where $y_{s,t}$ denotes the observation for time series "s" at time "t." The set of observations $y_{s,*} = (y_{s,1}, y_{s,2}, \ldots y_{s,T})$ can be referred to as a "time tube" for time series "s." Similarly, let $y_{*,t}=(y_{1,t}, y_{2,t}, \ldots y_{S,t})$ denote the observations for all time series in the model at time "t." A stochastic ARMA$^{xp}$ model that can be utilized to predict two time series is illustrated by a DAG model 500 shown in FIG. 5. Here, each time series is described by a stochastic ARMA (2,2) model, but in addition, the observations of $Y_{1,t-1}$ and $Y_{1,t}$ are also utilized to predict $Y_{2,t}$. For example, for $Y_{2,2}$ 502, $Y_{1,1}$ 504 and $Y_{1,2}$ 506 are also used. The additional dependencies are called "cross predictions"—hence "xp" in the name. Furthermore, each $Y_{s,t}$ is a linear regression (with independent Gaussian error) on all of its parents including cross predictors. With the exception of the early-time boundary, the linear regressions have the same parameters at each time slice.

In general, a stochastic ARMA$^{xp}$ model can involve multiple time series. With the exception of the early-time boundary, the local distributions corresponding to a given time series have the same parameters at each time slice. The local distributions for the early time slices are modified versions of those for the regular slice. In particular, for each continuous $Y_{s,t}$ that cannot have the same dependencies as the regular slice, the linear coefficients from $Y_{s,t}$'s continuous parents to $Y_{s,t}$ are set to zero (as illustrated in FIG. 5). Finally, the arcs in the model cannot form directed cycles.

Stochastic ARMA$^{xp}$ models, as described supra, are not identifiable. That is, an infinite number of parameter sets give rise to the same predictions. To make the models identifiable, a conditional variance of each $Y_{s,t}$ is set to a fixed small constant: $\sigma_s$. (Model predictions are fairly insensitive to $\sigma_s$ when $\sigma_s$ is small, such as when its value is approximately 0.01.) If the function relating each continuous $Y_{s,t}$ to its parents were deterministic (as it is in ARMA), then the gradient cannot be efficiently computed if data are incomplete. However, to estimate the parameters of a stochastic ARMA$^{xp}$ model given possibly incomplete data, one can apply a gradient-based optimization method. A gradient-based parameter optimization method can be utilized once a gradient can be efficiently determined. Thus, the subject invention provides a means to efficiently determine this gradient.

With the above specification, the joint distribution for all variables in a stochastic ARMA$^{xp}$ model is a Gaussian distribution—and is, therefore, a special case of a conditional Gaussian distribution, as defined in Lauritzen, S. L., & Wermuth, N.; Graphical Models for Associations Between Variables, Some of Which Are Qualitative and Some Quantitative; *The Annals of Statistics,* 17, 31-57; 1989. The joint Gaussian factorizes into local conditional distributions $p(X_v | X_{pa(v)})$, where $X_v$ is a particular variable and $X_{pa(v)}$ are the parents of $X_v$ according to a graphical DAG structure.

In particular, consider a part of the stochastic ARMA$^{xp}$ model which defines a particular time series (or time tube) in a set of time series defined by the model. This time series is indexed by "s." As described supra, this part of the model is defined by the conditional Gaussian distributions:

$$E_{s,t} \sim N(0, \gamma_s) \qquad \text{(Eq. 1)}$$

$$Y_{s,t} | Y_{s,t-p}, \ldots, Y_{s,t-1}, E_{s,t-q}, \ldots E_{s,t}, C_{s,1}, \ldots,$$
$$C_{s,r} \sim N(\mu_{s,t}, \sigma_s); \qquad \text{(Eq. 2)}$$

where a variance parameter, $Y_s$, for $E_{s,t}$ is shared across all time slices "t," and a functional expression for the mean $\mu_{s,t}$ and the variance $\sigma_s$ for $Y_{s,t} | Y_{s,t-p}, \ldots Y_{s,t-1}, E_{s,t-q}, \ldots E_{s,t}, C_{s,1}, \ldots, C_{s,r}$ are shared across all time slices "t." The variance $\sigma_s$ is fixed at a given (small) value to be specified by a user. The mean is related to the conditional variables as follows:

$$\mu_{s,t} = c_s + \sum_{i=1}^{p} \alpha_{s,i} Y_{s,t-i} + \sum_{j=0}^{q} \beta_{s,j} E_{s,t-j} + \sum_{k=1}^{r} \eta_{s,k} C_{s,k}; \qquad \text{(Eq. 3)}$$

where $c_s$ is the intercept for the regression, $$\sum_{i=1}^{p} \alpha_{s,i} Y_{s,t-i}$$

is the autoregressive (AR) part, $$\sum_{j=0}^{q} \beta_{s,j} E_{s,t-j}$$

is the moving average (MA) part, and $$\sum_{k=1}^{r} \eta_{s,k} C_{s,k}$$

is the cross-predictor part, where $C_{s,k}$ is a cross predictor (that is an observation variable from a related time series). The part of the model associated with the time series "s," therefore, involves the free parameters $(c_s, \beta^s = (\alpha_{s,1}, \ldots, \alpha_{s,p}, \beta_{s,0}, \ldots \beta_{s,q}, \eta_{s,1}, \ldots \eta_{s,r}), \gamma_s)$, and these parameters are tied across time slices. (The parts of the model associated with the other time series are defined in a similar way. Without loss of generality, attention can therefore be restricted to a single part of the stochastic ARMA$^{xp}$ model.) Two additional variations are also described: Variation 1 fixes the parameter $\gamma_s = 1$, variation 2 fixes the parameter $\beta_{s,0} = 1$. Notice that by fixing a parameter, it is excluded from the set of free parameters.

It is desired to compute the gradient for the conditional log-likelihood model where it is conditioned on the first R=max(p,q) variables. Relations between variables for t=1, ..., R can, therefore, be ignored by setting associated regression coefficients to zero. It should be noted that if a time series is artificially extended back in time for R (unobserved) time slices; this model represents what is known as an "exact likelihood model."

In Efficient Gradient Computation For Conditional Gaussian Graphical Models it is shown how to efficiently compute the parameter gradient for the log-likelihood in conditional Gaussian (CG) models. The derivation relies on first representing a CG model as a so-called "Recursive Exponential Mixed Model" (REMM), deriving the gradient for each CG regression in this representation, and then exploiting the chain-rule to transform the resulting expression into the traditional parameter representation in the form of an intercept, regression coefficients, and variance parameters for each of the local conditional distributions $p(X_v|X_{pa(v)})$.

Tying of parameters across time slices is, however, also an essential feature for the stochastic ARMA$^{xp}$ time-series models. The gradient can be obtained by adding up the gradients obtained at each time slice as if parameters are not tied. Before illustrating the gradient expression for the three variations of the stochastic ARMA$^{xp}$ time-series models, additional notation is required. Let $\theta$ denote the total parameterization for the CG model. That is, the parameterization for all of the conditional Gaussian regressions involved in this model. It is desired to determine the gradient $$\frac{\partial \log p(y_{*,R+1}, \ldots, y_{*,T} | y_{*,1} \ldots, y_{*,T}, \theta)}{\partial (c_s, \beta_s, \gamma_s)}.$$

Recall that $y_{*,t}$ denotes the (possible incomplete) observations at time "t" for all the time series in the models.

In the expression for the gradient, $(x_v^*, x_{pa(v)}^*)$ is utilized to denote the expected value for the vector $(X_v, X_{pa(v)})$ with respect to the posterior Gaussian distribution for $(X_v, X_{pa(v)})$ given the observation "y." That is, $$(x_v^*, x_{pa(v)}^*) = E_{(c_s, \beta_s, \gamma_s)}[X_v, X_{pa(v)}|y]. \qquad \text{(Eq. 4)}$$

Similarly, let $((x_v, x_{pa(v)})'(x_v, x_{pa(v)}))^*$ denote the expected value for the matrix $((X_v, X_{pa(v)})'(X_v, X_{pa(v)}))$, were ' denotes transpose. For example, $$(X_v, X_{pa(v)})^* = E_{(c_s, \beta_s, \gamma_s)}[X_v, X_{pa(v)}|y]. \qquad \text{(Eq. 5)}$$

Returning now to the gradient for the stochastic ARMA$^{xp}$ model, first consider the tied $E_{s,R+1}, \ldots, E_{s,T}$ variables for a particular time tube. Recall that these variables have no parents and are normally distributed with a fixed mean equal to zero and variance $\gamma_s$. Hence the only free parameter is in this case $\gamma_s$ for which the gradient can be computed as:

$$\frac{\partial \log p(y_{*,R+1}, \ldots, y_{*,T} | y_{*,1} \ldots, y_{*,T}, \theta)}{\partial \gamma_s} = \sum_{t=R+1}^{T} \frac{(e_{s,t}e_{s,t})^* - \gamma_s}{2\gamma_s^2}. \quad \text{(Eq. 6)}$$

Let $A_{s,t}=(Y_{s,t-p}, \ldots Y_{s,t-1}, E_{s,t-q}, \ldots E_{s,t}, C_{s,1}, \ldots, C_{s,r})$ denote all parents for the observation variable $Y_{s,t}$.

For the tied $Y_{s,R+1}, \ldots, Y_T$ variables in a particular time tube, the gradient with respect to the free parameters $(c_s, \beta_s)$ can be found as:

$$\frac{\partial \log p(y_{*,R+1}, \ldots, y_{*,T} | y_{*,1} \ldots, y_{*,T}, \theta)}{\partial (c_s, \beta_s)} = \quad \text{(Eq. 7)}$$

$$\sum_{t=R+1}^{T} \begin{bmatrix} (y_{s,t}^* - \beta_s a_{s,t}^* - c_s)/\sigma_s \\ (y_{s,t}a_{s,t})^* - c_s a_{s,t}^* - \beta(a_{s,t}'a_{s,t})^*)/\sigma_s \end{bmatrix}.$$

Consider now variation 1 for the stochastic ARMA$^{xp}$ model, where the variance parameter $\gamma_s$ is fixed as one. The gradient expression is similar to the above gradient expression for $(c_s,\beta_s)$. The gradient for $\gamma_s$ is not utilized, due to the fact that this parameter is fixed.

Next, consider variation 2 for the stochastic ARMA$^{xp}$ model, where the regression parameter $\beta_0$ is fixed as one. In this case, the expression for the gradient for $\gamma_s$ is the same as in Eq. 6 above, and the gradient expression for the free parameters associated with the conditional distributions for the observation variables changes as follows. Let $Z_{s,t}=A_{s,t}\backslash E_{s,t}$ denote the parents of $Y_{s,t}$ except for the parent $E_{s,t}$ associated with the fixed regression coefficient $\beta_{s,0}$. Denote the free regression coefficients as $\beta_s^{z_t}=\beta_s\backslash_{s,0}$. The gradient with respect to the free parameters $(c_s,\beta_s^{z_t})$ can be found as:

$$\frac{\partial \log p(y_{*,R+1}, \ldots, y_{*,T} | y_{*,1} \ldots, y_{*,T}, \theta)}{\partial (c_s, \beta_s^{z_t})} = \quad \text{(Eq. 8)}$$

$$\sum_{t=R+1}^{T} \begin{bmatrix} (y_{s,t}^* - \beta_s z_{s,t}^* - c_s)/\sigma_s \\ ((y_{s,t}z_{s,t})^* - c_s z_{s,t}^* - \beta_{s'}^z(z_{s,t}'z_{s,t})^*)/\sigma_s \end{bmatrix}.$$

As described earlier, a detailed derivation for these gradients can be found in Efficient Gradient Computation For Conditional Gaussian Graphical Models.

As described in the preceding reference, the Lauritzen and Jensen (2001) propagation scheme (see, Lauritzen, S. L., & Jensen, F.; Stable Local Computation with Conditional Gaussian Distributions; *Statistics and Computing*, 11, 191-203; 2001) for Bayesian networks with CG distributions, for example, can now be utilized to efficiently compute the quantities in the above gradient expressions. The propagation scheme enables efficient computation of posterior marginal distributions for any family $(X_v,X_{pa(v)})$ given evidence "y"—a family is a variable and its parents in the DAG representation. This marginal distribution is in a CG model with only continuous variables represented by a Gaussian distribution.

The mean vector $\mu^*$ and covariance matrix $\Sigma^*$ for this Gaussian distribution equals:

$$\mu^*=(x_v^*,x_{pa(v)}^*)$$

$$\Sigma^*=((x_v, x_{pa(v)})'(x_v,x_{pa(v)}))^*-(\mu^*)'\mu^* \quad \text{(Eq. 9)}$$

The expected statistics on the right-hand sides of the above gradient expressions can therefore easily be extracted from the parameterization of this marginal distribution and hence, the gradient for a stochastic ARMA$^{xp}$ model can be efficiently computed. Notice that the matrix:

$$((x_v,x_{pa(v)})'(x_v, x_{pa(v)}))^*=\Sigma^*+(\mu^*)'\mu^* \quad \text{(Eq. 10)}$$

partitions as:

| $(X_v X_v)^*$ | $(X_v X_{pa(v)})^*$ |
|---|---|
| $(X_v X_{pa(v)}')^*$ | $X_{pa(v)}'X_{pa(v)})^*$ |

The determined gradients provided by the subject invention can now be utilized in a gradient-based parameter optimization method.

In view of the exemplary systems shown and described above, methodologies that may be implemented in accordance with the subject invention will be better appreciated with reference to the flow charts of FIGS. 6-9. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 6:
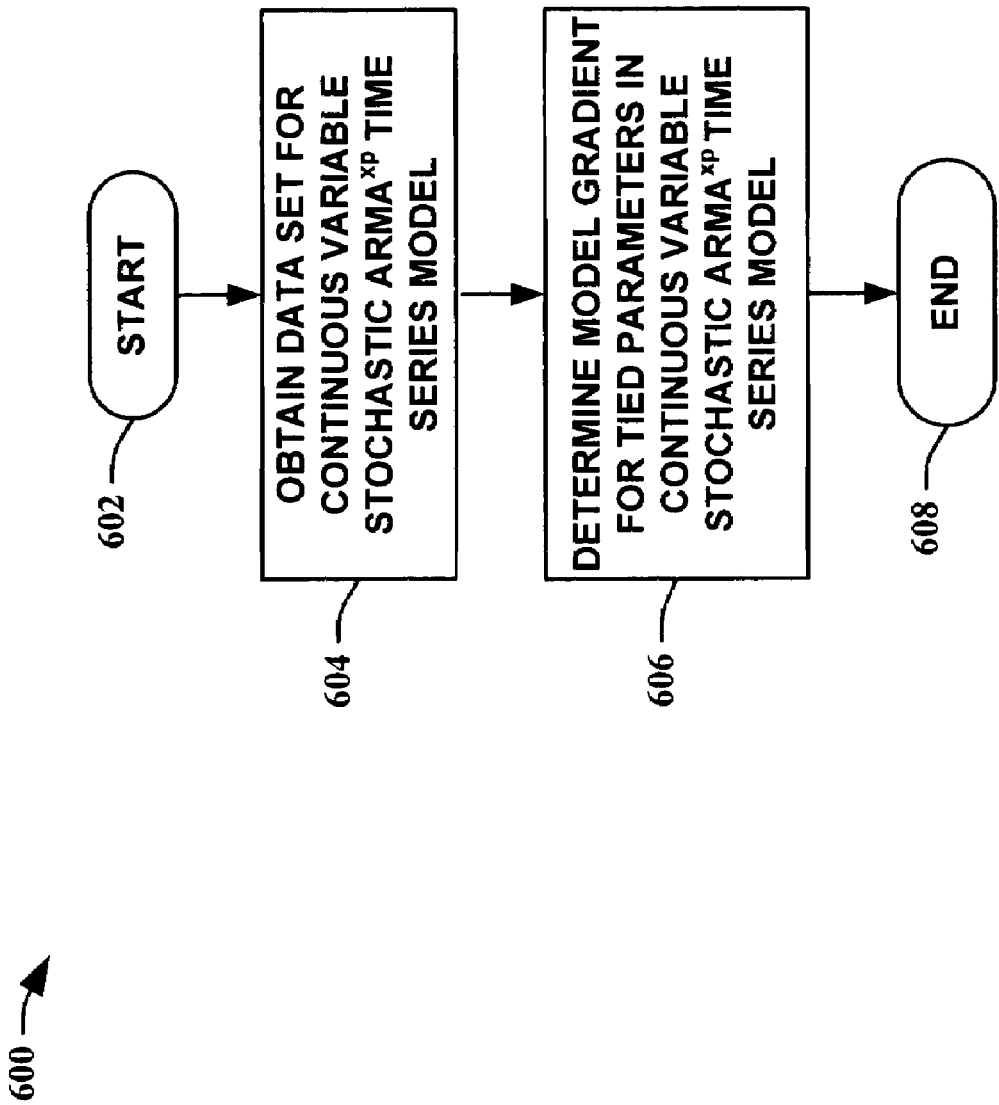
FIG. 6 is a flow diagram of a method for facilitating statistical modeling in accordance with an aspect of the subject invention.

In FIG. 6, a flow diagram of a method 600 for facilitating statistical modeling in accordance with an aspect of the subject invention is shown. The method 600 starts 602 by obtaining a data set for a continuous variable stochastic ARMA$^{xp}$ time series model with possibly incomplete data 604. A gradient for tied parameters of the continuous variable stochastic ARMA$^{xp}$ time series is then determined from the data set 606, ending the flow 608. Thus, the subject invention provides a means to facilitate in determining parameters of the continuous variable stochastic ARMA$^{xp}$ time series model without utilizing an expectation maximization (EM) based process, but instead utilizing a gradient based optimization process.

Figure 7:
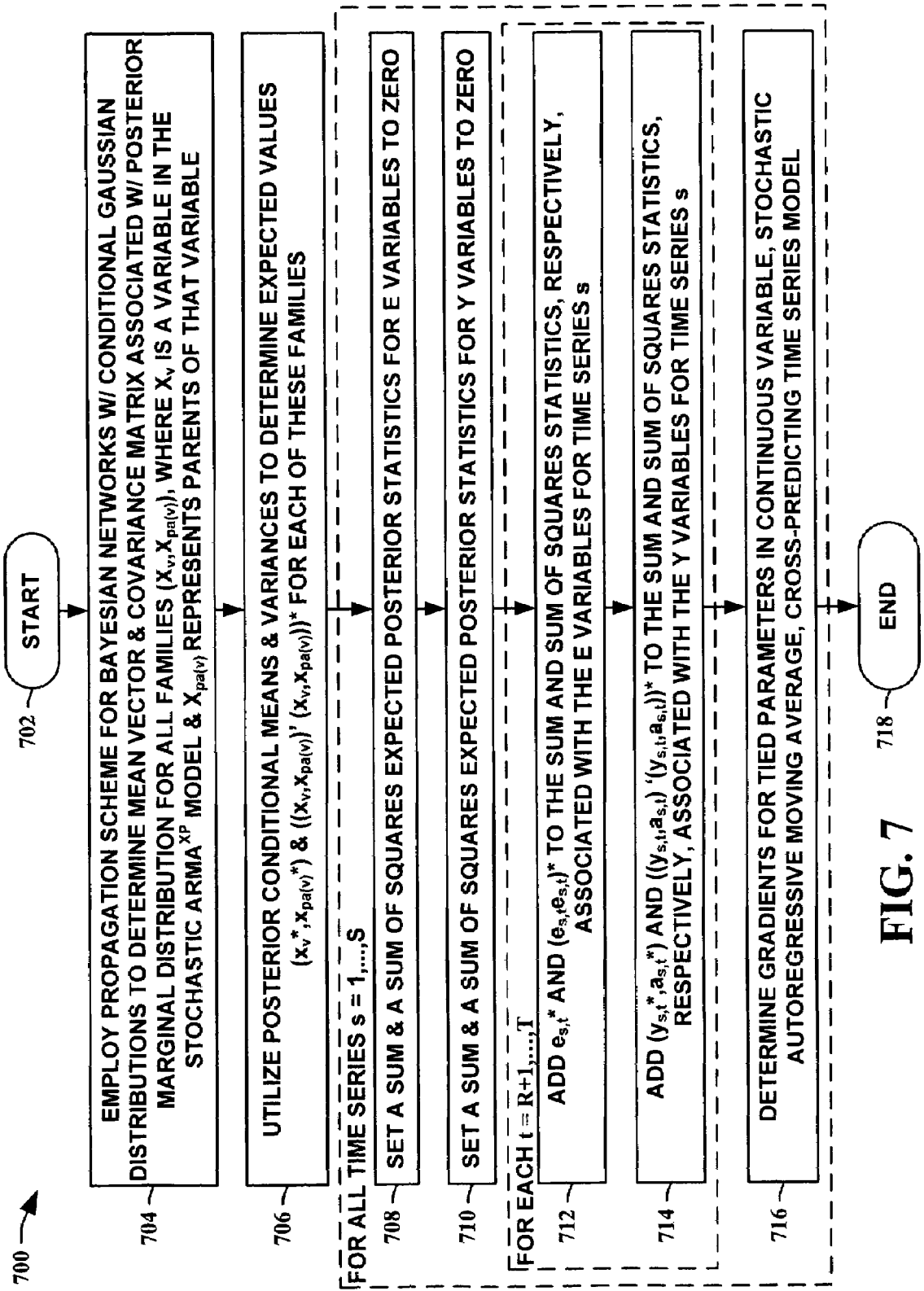
FIG. 7 is another flow diagram of a method for facilitating statistical modeling in accordance with an aspect of the subject invention.

Referring to FIG. 7, another flow diagram of a method 700 for facilitating statistical modeling in accordance with an aspect of the subject invention is depicted. The method 700 starts in 702 by employing a propagation scheme for Bayesian networks with conditional Gaussian distributions to determine a mean vector and a covariance matrix associated with a posterior marginal distribution for all families $(X_v,X_{pa(v)})$, where $X_v$ is a variable in the stochastic ARMA$^{xp}$ model and $X_{pa(v)}$ represents parents of that variable 704. For example, the Lauritzen and Jensen (2001) algorithm can be utilized to determine the mean vector and the covariance matrix. The posterior conditional means and variances are then utilized to determine the expected values $(x_v^*,x_{pa(v)}^*)$ and $((x_v,x_{pa(v)})'(x_v,x_{pa(v)}))^*$ for each of these families 706. The following steps are completed for all time series s=1, . . . ,S. A sum and a sum of squares expected posterior statistics for E variables are set to zero 708. A sum and a sum of squares expected posterior statistics for Y variables are set to zero 710. The following two steps are then completed for each t=R+1 . . . ,T. $e_{s,t}*$ and $(e_{s,t}e_{s,t})*$ are added to the sum and sum of squares statistics, respectively, associated with the E variables for time series "s" 712. $(y_{s,t}*,a_{s,t}*)$ and $((y_{s,t},a_{s,t})'(y_{s,t},a_{s,t}))*$ are added to the sum and sum of squares statistics, respectively, associated with the Y variables for time series "s" 714. The gradients for the tied parameters in the continuous variable, stochastic autoregressive moving average, cross-predicting time series model are then determined utilizing:

$$\frac{\partial \log\ p(y_{*,R+1}, \ldots, y_{*,T} | y_{*,1} \ldots, y_{*,T}, \theta)}{\partial \gamma_s} = \qquad \text{(Eq. 6)}$$

$$\sum_{t=R+1}^{T} \frac{(e_{s,t}e_{s,t})^* - \gamma_s}{2\gamma_s^2};$$

and, $$\frac{\partial \log\ p(y_{*,R+1}, \ldots, y_{*,T} | y_{*,1} \ldots, y_{*,T}, \theta)}{\partial (c_s, \beta_s)} = \qquad \text{(Eq. 7)}$$

$$\sum_{t=R+1}^{T} \begin{bmatrix} (y_{s,t}^* - \beta_s a_{s,t}^* - c_s)/\sigma_s \\ ((y_{s,t}a_{s,t})^* - c_s a_{s,t}^* - \beta(a'_{s,t}a_{s,t})^*)/\sigma_s \end{bmatrix};$$

for all time series s=1, . . . ,S 716, ending the flow 718.

Figure 8:
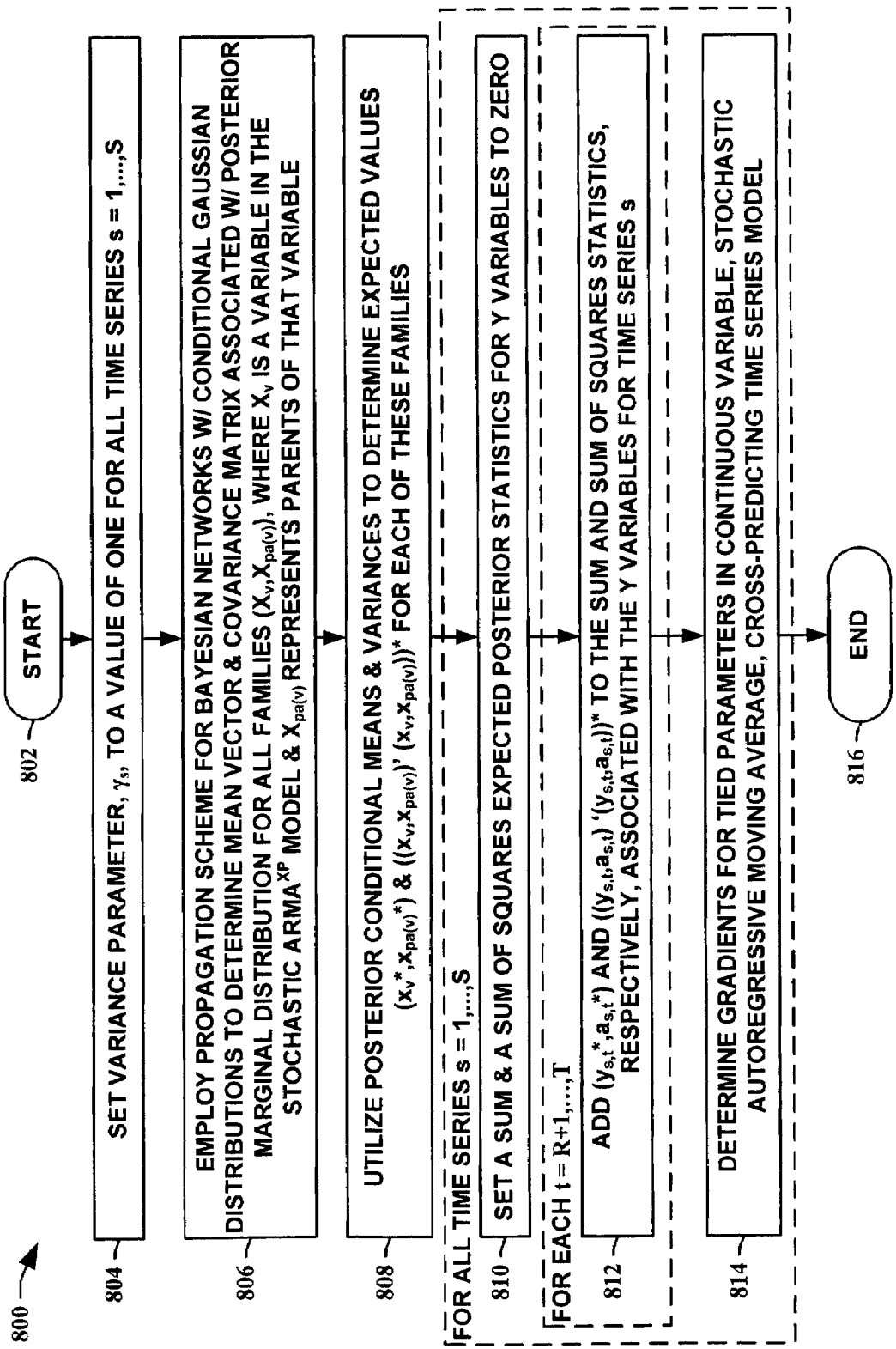
FIG. 8 is yet another flow diagram of a method for facilitating statistical modeling in accordance with an aspect of the subject invention.

Turning to FIG. 8, yet another flow diagram of a method 800 for facilitating statistical modeling in accordance with an aspect of the subject invention is illustrated. The method 800 starts 802 by setting a variance parameter, $\gamma_s$, to a value of one for all time series s=1, . . . ,S 804. This precludes this variable from the set of free variables. The gradient expression utilized in this method 800 is similar to the gradient expression for $(c_s,\beta_s)$ in Eq. 7. The gradient for $\gamma_s$ is not utilized, due to the fact that this parameter is fixed. A propagation scheme for Bayesian networks with conditional Gaussian distributions is employed to determine a mean vector and a covariance matrix associated with a posterior marginal distribution for all families $(X_v, X_{pa(v)})$, where $X_v$ is a variable in the stochastic ARMA$^{xp}$ model and $X_{pa(v)}$ represents parents of that variable 806. For example, the Lauritzen and Jensen (2001) algorithm can be utilized to determine the mean vector and the covariance matrix. The posterior conditional means and variances are then utilized to determine the expected values $(x_v*, x_{pa(v)}*)$ and $((x_v, x_{pa(v)})'(x_v, x_{pa(v)}))*$ for each of these families 808. The following steps are then completed for all time series s=1,...,S. A sum and a sum of squares expected posterior statistics for Y variables are set to zero 810. $(y_{s,t}*,a_{s,t}*)$ and $((y_{s,t},a_{s,t})'(y_{s,t},a_{s,t}))*$ are added to the sum and sum of squares statistics, respectively, associated with the Y variables for time series "s" for each t=R+1,...,T 812. The gradients for the tied parameters in the continuous variable, stochastic autoregressive moving average, cross-predicting time series model are then determined utilizing:

$$\frac{\partial \log\ p(y_{*,R+1}, \ldots, y_{*,T} | y_{*,1} \ldots, y_{*,T}, \theta)}{\partial (c_s, \beta_s)} = \qquad \text{(Eq. 7)}$$

$$\sum_{t=R+1}^{T} \begin{bmatrix} (y_{s,t}^* - \beta_s a_{s,t}^* - c_s)/\sigma_s \\ ((y_{s,t}a_{s,t})^* - c_s a_{s,t}^* - \beta(a'_{s,t}a_{s,t})^*)/\sigma_s \end{bmatrix};$$

for all time series s=1,...,S 814, ending the flow 816.

Figure 9:
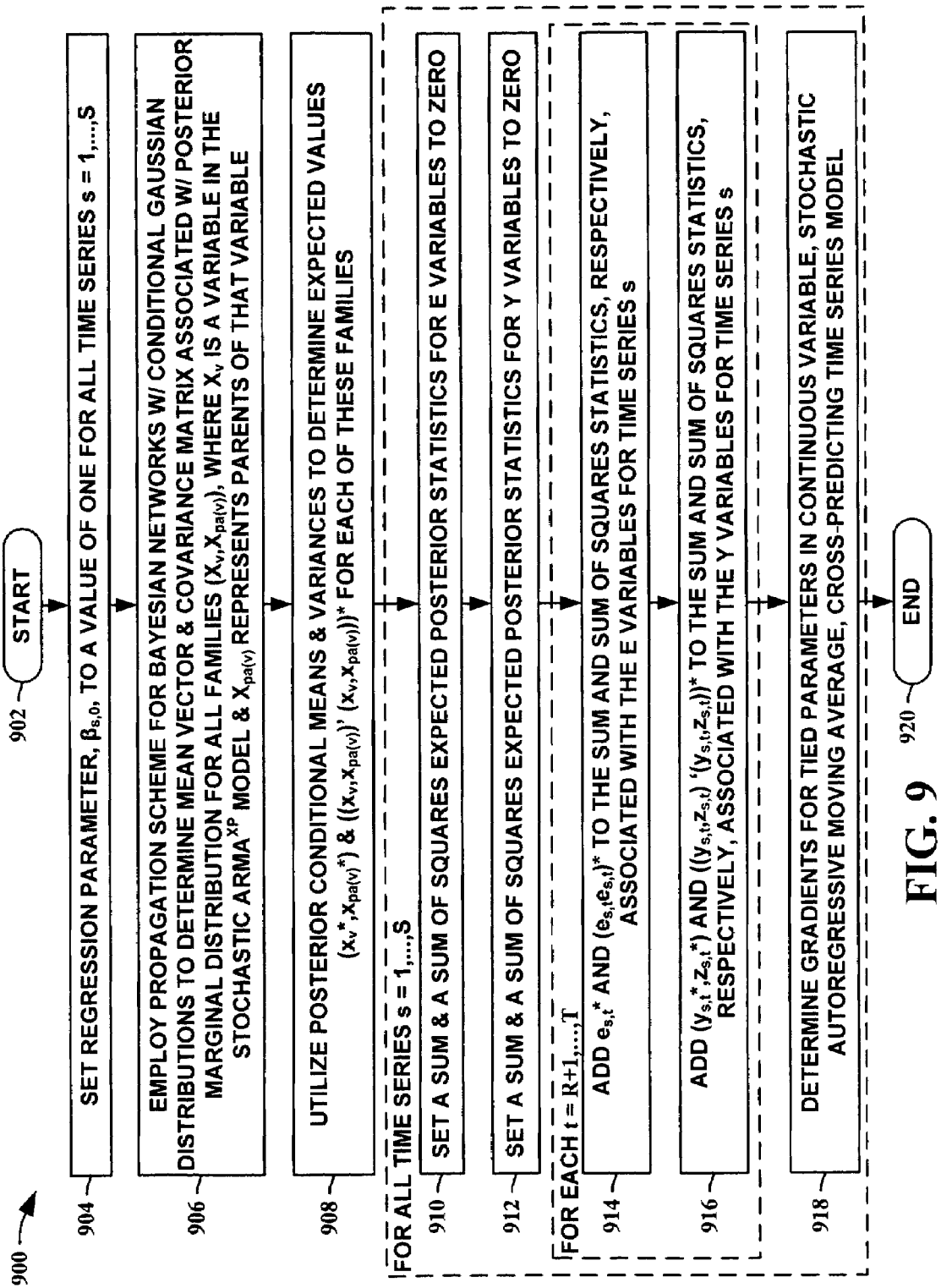
FIG. 9 is still yet another flow diagram of a method for facilitating statistical modeling in accordance with an aspect of the subject invention.

Moving on to FIG. 9, still yet another flow diagram of a method 900 for facilitating statistical modeling in accordance with an aspect of the subject invention is shown. The method 900 starts 902 by setting regression parameter, $\beta_{s,0}$, to a value of one for all time series s=1, . . . ,S 904. This precludes this variable from the set of free variables. In this case, the expression for the gradient for $\gamma_s$ is the same as Eq. 6, and the gradient expression for the free parameters associated with the conditional distributions for the observation variables is Eq. 8. A propagation scheme for Bayesian networks with conditional Gaussian distributions is employed to determine a mean vector and a covariance matrix associated with a posterior marginal distribution for all families $(X_v, X_{pa(v)})$, where $X_v$ is a variable in the stochastic ARMA$^{xp}$ model and $X_{pa(v)}$ represents parents of that variable 906. For example, the Lauritzen and Jensen (2001) algorithm can be utilized to determine the mean vector and the covariance matrix. The posterior conditional means and variances are then utilized to determine the expected values $(x_v*, x_{pa(v)}*)$ and $((x_v, x_{pa(v)})'(x_v, x_{pa(v)}))*$ for each of these families 908. The following steps are then completed for all time series s=1,...,S. A sum and a sum of squares expected posterior statistics for E variables are set to zero 910. A sum and a sum of squares expected posterior statistics for Y variables are set to zero 912. The following two steps are completed for each t=R+1,...,T. $e_{s,t}*$ and $(e_{s,t}e_{s,t})*$ are added to the sum and sum of squares statistics, respectively, associated with the E variables for time series "s" 914. $(y_{s,t}*z_{s,t}*)$ and $((y_{s,t}z_{s,t})'(y_{s,t}z_{s,t}))*$ are added to the sum and sum of squares statistics, respectively, associated with the Y variables for time series "s" 916. The gradients for the tied parameters in the continuous variable, stochastic autoregressive moving average, cross-predicting time series model are then determined utilizing:

$$\frac{\partial \log p(y*_{,R+1}, \ldots, y*_{,T} | y*_{,1} \ldots, y*_{,T}, \theta)}{\partial \gamma_s} = \qquad \text{(Eq. 6)}$$

$$\sum_{t=R+1}^{T} \frac{(e_{s,t}e_{s,t})^* - \gamma_s}{2\gamma_s^2};$$

and, $$\frac{\partial \log p(y*_{,R+1}, \ldots, y*_{,T} | y*_{,1} \ldots, y*_{,T}, \theta)}{\partial (c_s, \beta_s)} = \qquad \text{(Eq. 8)}$$

$$\sum_{t=R+1}^{T} \begin{bmatrix} (y_{s,t}^* - \beta_s z_{s,t}^* - c_s)/\sigma_s \\ ((y_{s,t}z_{s,t})^* - c_s z_{s,t}^* - \beta_s^{zt}(z'_{s,t}z_{s,t})^*)/\sigma_s \end{bmatrix};$$

for all time series s=1,...,S 918, ending the flow 920.

Figure 10:
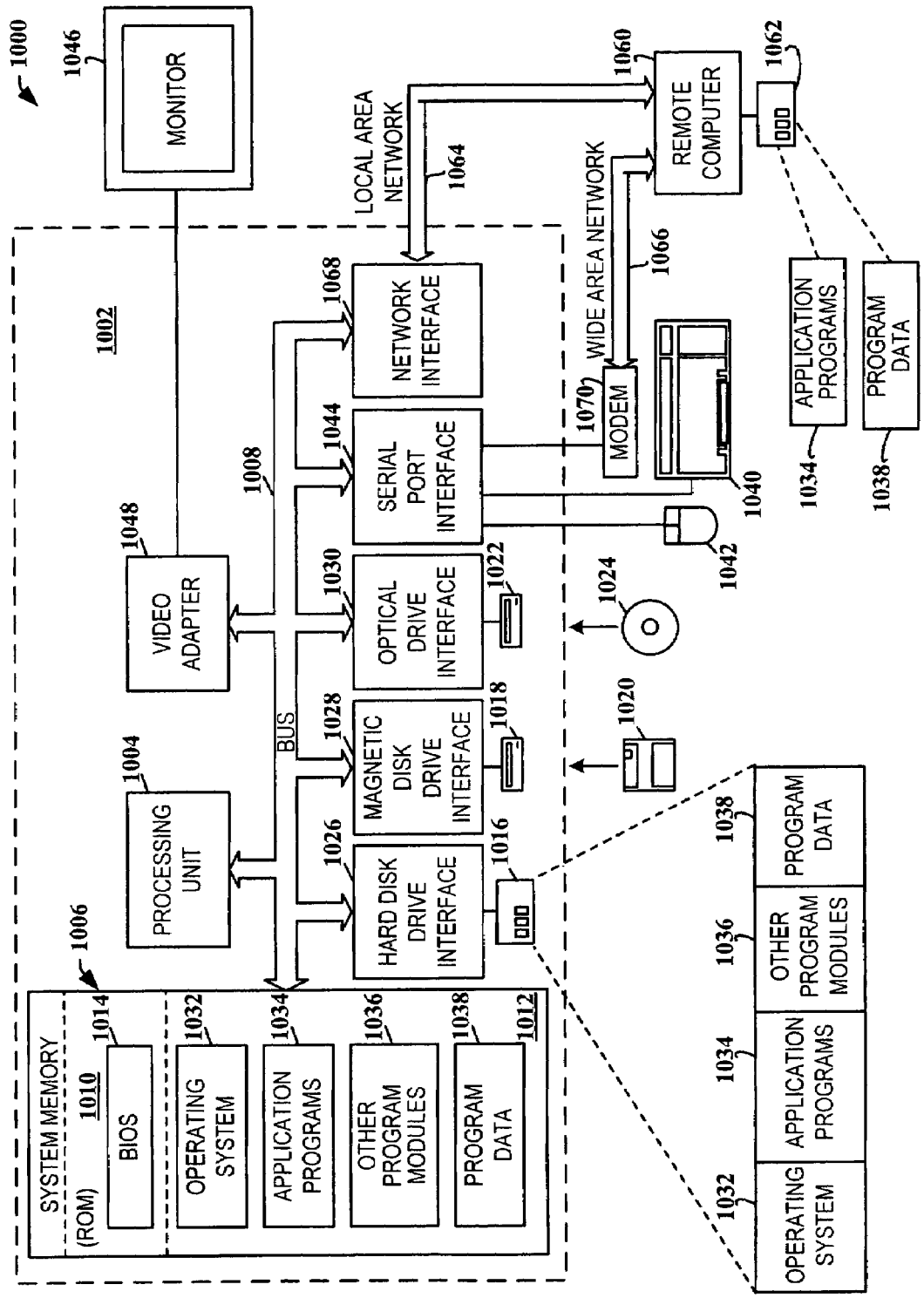
FIG. 10 illustrates an example operating environment in which the subject invention can function.

In order to provide additional context for implementing various aspects of the subject invention, FIG. 10 and the following discussion are intended to provide a brief, general description of a suitable computing environment 1000 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the subject invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 can include a statistical model facilitating component in accordance with an aspect of the subject invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the subject invention.

Figure 11:
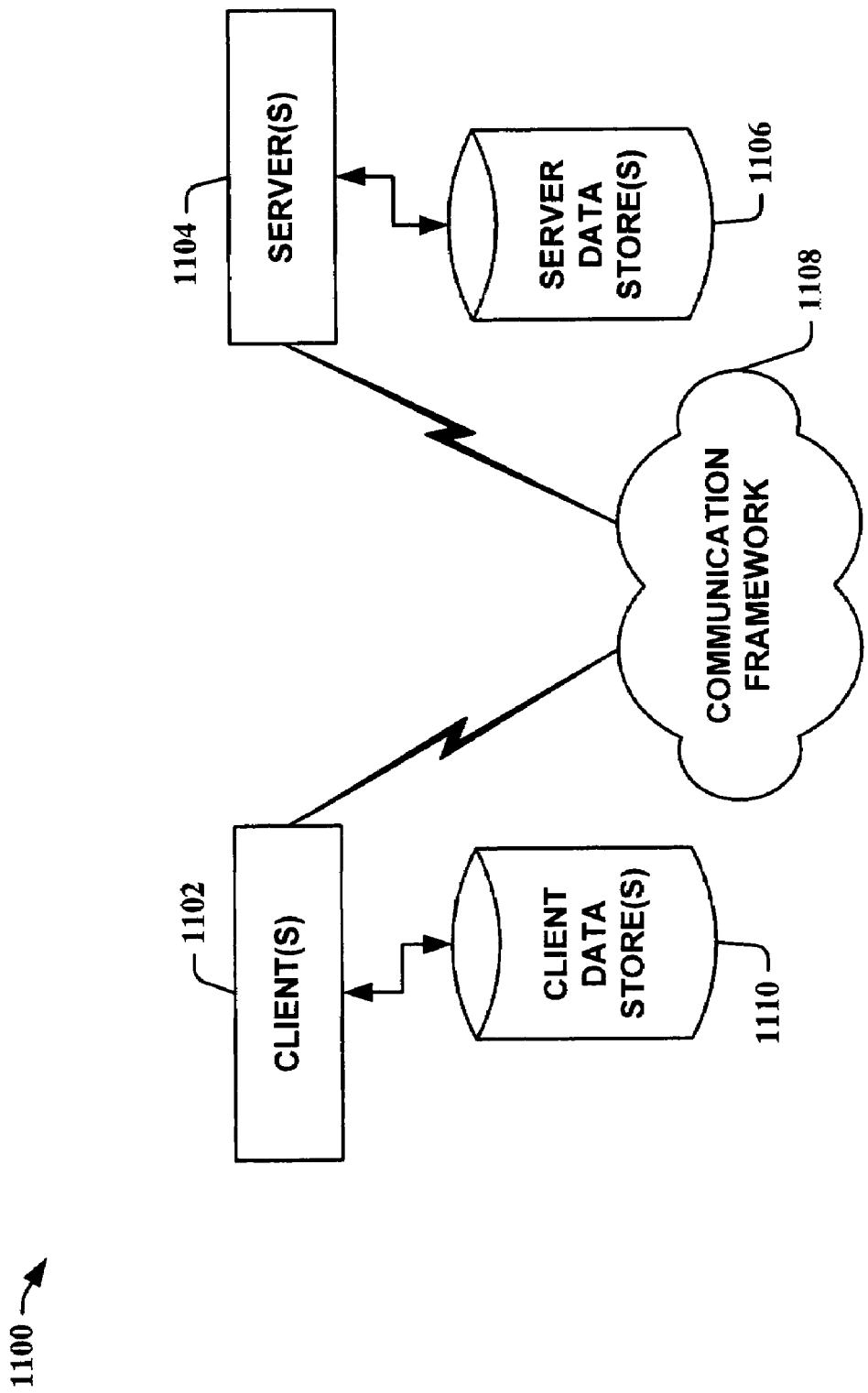
FIG. 11 illustrates another example operating environment in which the subject invention can function.

In accordance with the practices of persons skilled in the art of computer programming, the subject invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

FIG. 11 is another block diagram of a sample computing environment 1100 with which the subject invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the subject invention, for example. One possible communication between a client 1102 and a server 1104 may be in the form of a data packet adapted to be transmitted between two or more computer processes. The system 1100 includes a communication framework 1108 that can be employed to facilitate communications between the client(s) 1102 and the server(s) 1104. The client(s) 1102 are connected to one or more client data store(s) 1110 that can be employed to store information local to the client(s) 1102. Similarly, the server(s) 1104 are connected to one or more server data store(s) 1106 that can be employed to store information local to the servers 1104.

In one instance of the subject invention, a data packet is transmitted between two or more computer components that facilitates statistical modeling, the data packet comprised of, at least in part, information relating to a gradient determination system that determines a conditional log-likelihood model gradient for tied parameters in a continuous variable, stochastic autoregressive moving average cross-predicting (ARMA$^{xp}$) time series model.

It is to be appreciated that the systems and/or methods of the subject invention can be utilized in a statistical model facilitating scheme for facilitating computer components and non-computer related components alike. Further, those skilled in the art will recognize that the systems and/or methods of the subject invention can be employed in a vast array of electronic related technologies, including, but not limited to, computers, servers and/or handheld electronic devices and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computer readable storage medium having stored thereon components that facilitates statistical modeling, the components comprising:

a gradient determination component that determines a conditional log-likelihood model gradient for tied parameters by employing a Recursive Exponential Mixed Model (REMM) in a continuous variable, stochastic autoregressive moving average, cross-predicting (stochastic ARMA$^{xp}$) time series model;

a gradient search component that determines optimal parameters to generate the stochastic ARMA$^{xp}$ time series model by employing the conditional log-likelihood model gradient of the tied parameters;

a receiving component that receives a query; and a statistical modeling component that applies the query to the stochastic ARMA$^{xp}$ time series model and generates data predictions for the received query.

2. The medium of claim 1 further comprising: the statistical modeling component employs a gradient-based learning process to estimate parameters of the model.

3. The medium of claim 2, the gradient-based learning process comprising a gradient-based optimization process that utilizes the gradient to iteratively adapt the parameters of the model to improve the incomplete-data log-likelihood in order to identify the maximum likelihood estimate and/or local maxima of the incomplete-data log-likelihood.

4. The medium of claim 3, the gradient-based optimization process comprising a conjugate gradient process.

5. The medium of claim 1, the time series model comprising a model wherein conditional variance of each continuous time tube variable is fixed to a small positive value.

6. The medium of claim 5, the small positive value approximately equal to a value of 0.01.

7. The medium of claim 1, the gradient determination component utilizes at least one fixed parameter to facilitate in determining the model gradient.

8. The medium of claim 7, the fixed parameter having a value of one.

9. The medium of claim 7, the fixed parameter comprising a regression parameter.

10. The medium of claim 7, the fixed parameter comprising a variance parameter.

11. A device employing the system of claim 1 comprising at least one selected from the group consisting of a computer, a server, or a handheld electronic device.

12. A method for facilitating statistical modeling, comprising:

obtaining an incomplete data set for a continuous variable, stochastic autoregressive moving average, cross-predicting (stochastic ARMA$^{xp}$) time series model; and determining a conditional log-likelihood model gradient, for parameters tied across time steps by employing a Recursive Exponential Mixed Model (REMM) in the continuous variable, stochastic autoregressive moving average cross-predicting time series model utilizing the data set;

selecting optimal parameters based on the determined model gradient for the parameters;

constructing the continuous variable, stochastic autoregressive moving average, cross-predicting (stochastic ARMA$^{xp}$) time series model utilizing the selected parameters; and generating data predictions for a given query from the time series model.

13. The method of claim 12 further comprising:

utilizing at least one fixed parameter to facilitate in determining the model gradient.

14. The method of claim 13, the fixed parameter having a value of one.

15. The method of claim 13, the fixed parameter comprising a regression parameter.

16. The method of claim 13, the fixed parameter comprising a variance parameter.

17. The method of claim 12 further comprising:

employing a plurality of processes for determining the gradients for the time series model; each process, respectively, utilizing sum and sum of squares statistics and gradient determination expressions based on process variations for a particular time series "s" of the time series model.

18. The method of claim 12 further comprising:

employing a propagation scheme for Bayesian networks with conditional Gaussian distributions to determine a mean vector and a covariance matrix associated with a posterior marginal distribution for all families $(X_v, X_{pa(v)})$, where $X_v$ is a continuous variable in the stochastic ARMA$^{xp}$ model and $X_{pa(v)}$ represents the parents of that variable;

utilizing posterior conditional means and variances to determine expected values $(X_v^*, X_{pa(v)}^*)$ and $((X_v, X_{pa(v)})'(X_v, X_{pa(v)}))^*$ for each of these families;

For all time series s=1, . . . ,S:

setting a sum and a sum of squares expected posterior statistics for E variables to zero;

setting a sum and a sum of squares expected posterior statistics for Y variables to zero;

for each t=R+1, . . . ,T:

adding $e_{s,t}^*$ and $(e_{s,t}e_{s,t})^*$ to the sum and sum of squares statistics, respectively, associated with the E variables for time series s;

adding $(y_{s,t}^*, a_{s,t}^*)$ and $((y_{s,t}, a_{s,t})'(y_{s,t}, a_{s,t}))^*$ to the sum and sum of squares statistics, respectively, associated with the Y variables for time series s; and determining the gradient for tied parameters in the continuous variable, stochastic autoregressive moving average, cross-predicting (stochastic ARMA$^{xp}$) time series model utilizing:

$$\frac{\partial \log p(y*_{,R+1}, \ldots, y*_{,T} | y*_{,1} \ldots, y*_{,T}, \theta)}{\partial \gamma_s} = \quad \text{(Eq. 6)}$$

$$\sum_{t=R+1}^{T} \frac{(e_{s,t}e_{s,t})^* - \gamma_s}{2\gamma_s^2};$$

and, $$\frac{\partial \log p(y*_{,R+1}, \ldots, y*_{,T} | y*_{,1} \ldots, y*_{,T}, \theta)}{\partial (c_s, \beta_s)} = \quad \text{(Eq. 7)}$$

$$\sum_{t=R+1}^{T} \begin{bmatrix} (y_{s,t}^* - \beta_s a_{s,t}^* - c_s)/\sigma_s \\ ((y_{s,t}a_{s,t})^* - c_s a_{s,t}^* - \beta(a'_{s,t}a_{s,t})^*)/\sigma_s \end{bmatrix}.$$

19. The method of claim 12 further comprising:

setting a variance parameter, $\gamma_s$, to a value of one for all time series s=1, . . . ,S in the model;

employing a propagation scheme for Bayesian networks with conditional Gaussian distributions to determine a mean vector and a covariance matrix associated with a posterior marginal distribution for all families $(X_v, X_{pa(v)})$, where $X_v$ is a continuous variable in the stochastic ARMA$^{xp}$ model and $X_{pa(v)}$ represents the parents of that variable;

utilizing posterior conditional means and variances to determine expected values $(X_v^*, X_{pa(v)}^*)$ and $((X_v, X_{pa(v)})'(X_v, X_{pa(v)}))^*$ for each of these families;

For all time series s=1, . . . ,T:

setting a sum and a sum of squares expected posterior statistics for Y variables to zero;

for each t=R+1, . . . ,T:

adding $(y_{s,t}^*, a_{s,t}^*)$ and $((y_{s,t}, a_{s,t})'(y_{s,t}, a_{s,t}))^*$ to the sum and sum of squares statistics, respectively, associated with the Y variables for time series s; and determining the gradient for tied parameters in the continuous variable, stochastic autoregressive moving average, cross-predicting (stochastic ARMA$^{xp}$) time series model utilizing:

$$\frac{\partial \log p(y*_{,R+1}, \ldots, y*_{,T} | y*_{,1} \ldots, y*_{,T}, \theta)}{\partial (c_s, \beta_s)} = \quad \text{(Eq. 7)}$$

$$\sum_{t=R+1}^{T} \begin{bmatrix} (y_{s,t}^* - \beta_s a_{s,t}^* - c_s)/\sigma_s \\ ((y_{s,t}a_{s,t})^* - c_s a_{s,t}^* - \beta(a'_{s,t}a_{s,t})^*)/\sigma_s \end{bmatrix}.$$

20. The method of claim 12 further comprising:

setting a regression parameter, $\beta_{s,o}$, to a value of one for all time series s=1, . . . ,S in the model;

employing a propagation scheme for Bayesian networks with conditional Gaussian distributions to determine a mean vector and a covariance matrix associated with a posterior marginal distribution for all families $(X_v, X_{pa(v)})$, where $X_v$ is a continuous variable in the stochastic ARMA$^{xp}$ model and $X_{pa(v)}$ represents the parents of that variable;

utilizing posterior conditional means and variances to determine expected values $(X_v^*, X_{pa(v)}^*)$ and $((X_v, X_{pa(v)})'(X_v, X_{pa(v)}))^*$ for each of these families;

For all time series s=1, . . . ,S:

setting a sum and a sum of squares expected posterior statistics for E variables to zero;

setting a sum and a sum of squares expected posterior statistics for Y variables to zero;

for each t=R+1, . . . , T:

adding $e_{s,t}^*$ and $(e_{s,t}e_{s,t})^*$ to the sum and sum of squares statistics, respectively, associated with the E variables for time series s;

adding $(y_{s,t}^*, z_{s,t}^*)$ and $((y_{s,t}, z_{s,t})'(y_{s,t}, z_{s,t}))^*$ to the sum and sum of squares statistics, respectively, associated with the Y variables for time series s; and determining the gradients for tied parameters in the continuous variable, stochastic autoregressive moving average, cross-predicting (stochastic ARMA$^{xp}$) time series model utilizing:

$$\frac{\partial \log p(y*_{,R+1}, \ldots, y*_{,T} | y*_{,1} \ldots, y*_{,T}, \theta)}{\partial \gamma_s} = \quad \text{(Eq. 6)}$$

$$\sum_{t=R+1}^{T} \frac{(e_{s,t}e_{s,t})^* - \gamma_s}{2\gamma_s^2};$$

and, $$\frac{\partial \log p(y*_{,R+1}, \ldots, y*_{,T} | y*_{,1} \ldots, y*_{,T}, \theta)}{\partial (c_s, \beta_s^{z_t})} = \quad \text{(Eq. 8)}$$

$$\sum_{t=R+1}^{T} \begin{bmatrix} (y_{s,t}^* - \beta_s z_{s,t}^* - c_s)/\sigma_s \\ ((y_{s,t}z_{s,t})^* - c_s z_{s,t}^* - \beta_s^{z_t}(z'_{s,t}z_{s,t})^*)/\sigma_s \end{bmatrix}.$$

21. A system that facilitates statistical modeling, comprising:
- means for storing a data set for a continuous variable, stochastic autoregressive moving average, cross-predicting (stochastic ARMA$^{xp}$) time series model;
- means for employing a Recursive Exponential Mixed Model (REMM) to facilitate in determining a model gradient;
- means for determining the conditional log-likelihood model gradient for tied parameters in the continuous variable, stochastic autoregressive moving average, cross-predicting time series model utilizing the data set;
- means for selecting optimal parameters for constructing the continuous variable, stochastic autoregressive moving average, cross-predicting (stochastic ARMA$^{xp}$) time series model based on the determined model gradients; and
- means for making data predictions from the stochastic ARMA$^{xp}$ time series in response to a received query.

22. The system of claim 21 further comprising:
- means for utilizing a gradient-based learning process to estimate parameters of the time series model via employment of the determined gradient.

23. The system of claim 22, the gradient-based learning process comprising a conjugate gradient process.

24. The system of claim 21 further comprising:
- means for utilizing at least one fixed parameter to facilitate in determining the model gradient.

25. The system of claim 24, the fixed parameter comprising a regression parameter.

26. The system of claim 24, the fixed parameter comprising a variance parameter.

27. A device employing the method of claim 12 comprising at least one selected from the group consisting of a computer, a server, or a handheld electronic device.

* * * * *